US012584595B2

(12) United States Patent
Cledat et al.

(10) Patent No.: US 12,584,595 B2
(45) Date of Patent: Mar. 24, 2026

(54) ATTACHMENT DEVICE FOR ATTACHING SELF-SEALING PLATES TO THE EXTERNAL WALL OF A TANK, ASSEMBLY EQUIPPED WITH SUCH AN ATTACHMENT DEVICE AND ASSOCIATED MOUNTING METHOD

(71) Applicant: HUTCHINSON, Paris (FR)

(72) Inventors: Johan Cledat, Mello (FR); Youssef Ikhmouchen, Mery sur Oise (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 18/613,457

(22) Filed: Mar. 22, 2024

(65) Prior Publication Data

US 2024/0318788 A1 Sep. 26, 2024

(30) Foreign Application Priority Data

Mar. 24, 2023 (FR) .................................... 2302844
Jul. 27, 2023 (FR) .................................... 2308103

(51) Int. Cl.
*F17C 13/12* (2006.01)

(52) U.S. Cl.
CPC .... *F17C 13/123* (2013.01); *F17C 2205/0115* (2013.01); *F17C 2209/22* (2013.01); *F17C 2221/033* (2013.01)

(58) Field of Classification Search
CPC .... B65D 90/0009; B65D 90/00; B65D 90/22; F17C 13/12; F17C 13/123; F17C 2205/0115; F17C 2205/0103; F17C 2205/01; B60K 15/03; B60K 15/03006; B60K 2015/03059; B60K 2015/03065; B60K 2015/03407
See application file for complete search history.

(56) References Cited

U.S. PATENT DOCUMENTS 2,712,326 A * 7/1955 Yurdin .................. B65D 90/00 29/402.09
5,383,567 A * 1/1995 Sorathia ........... B60K 15/03177 220/900
2012/0181207 A1* 7/2012 Cook ..................... B60K 15/03 206/524.3

FOREIGN PATENT DOCUMENTS

CN 108290496 A * 7/2018 .............. F16C 11/06
CN 109562689 A * 4/2019 ............. B60K 15/07
DE 102020134643 A1 * 6/2022 ........... B60K 15/063

* cited by examiner

*Primary Examiner* — Javier A Pagan
(74) *Attorney, Agent, or Firm* — FisherBroyles, LLP; Roger L. Browdy; Ronni S. Jillions

(57) ABSTRACT

The invention relates to an attachment device for attaching (DA) self-sealing plates against an external wall of a tank, said attachment device comprising:
- a part (PC) shapeable to the shape of said self-sealing plates;
- a plurality of straps (S1, S2, S3);
- a first connection means (PBM, PLQ, PBC) between the straps (S1, S2, S3) and the shapeable part (PC);
- a second connection means (DBM, DLQ) between the straps (S1, S2, S3) and the shapeable part (PC).

12 Claims, 9 Drawing Sheets

[Fig 1]
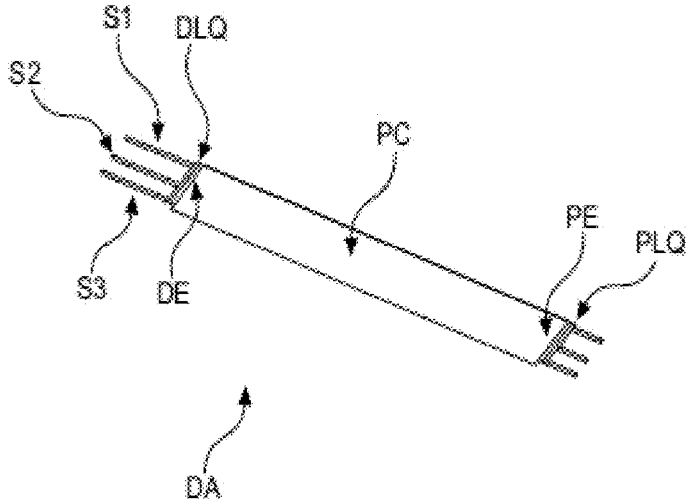

[Fig.2]
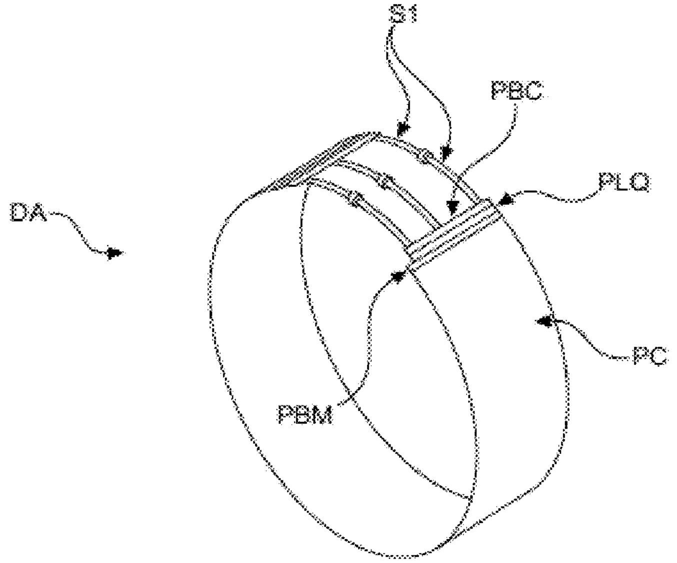

[Fig.3]
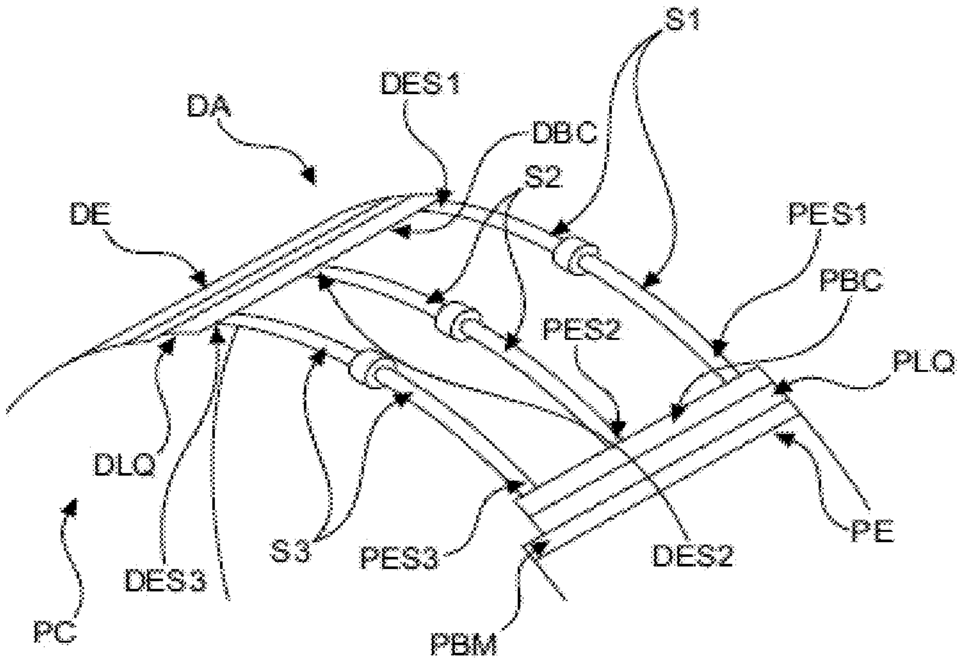

[Fig.4]
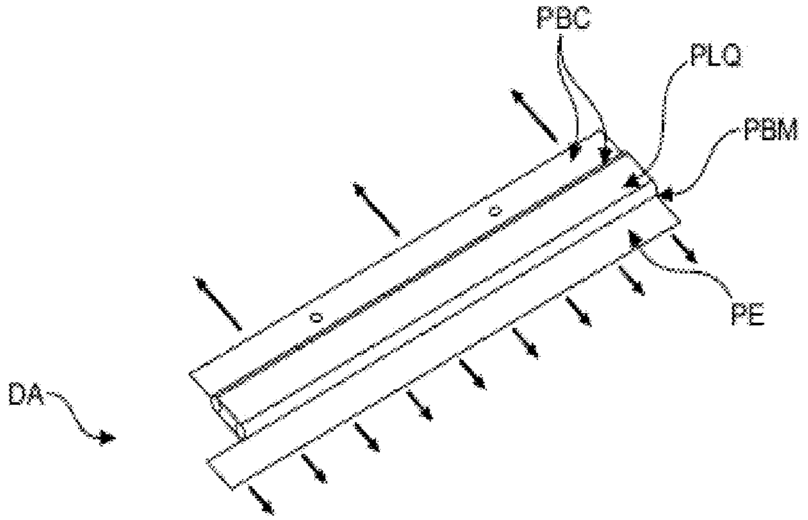

[Fig.5]
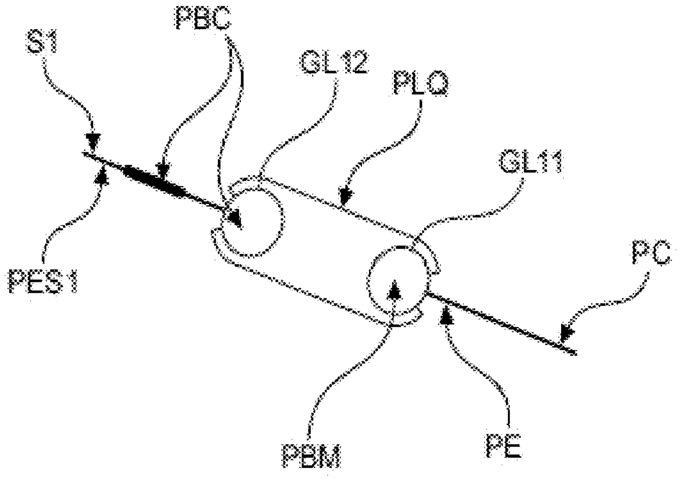

[Fig. 6]
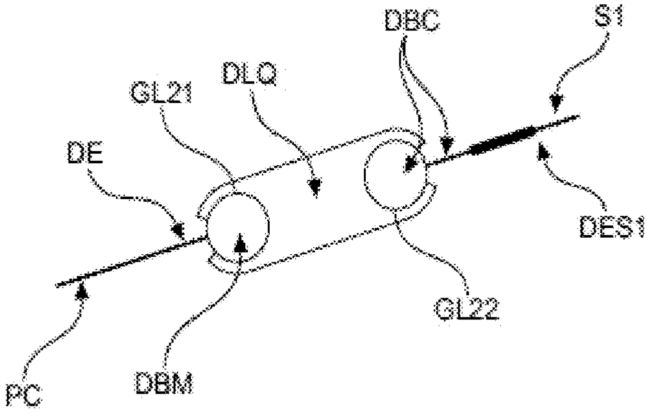

[Fig. 7]
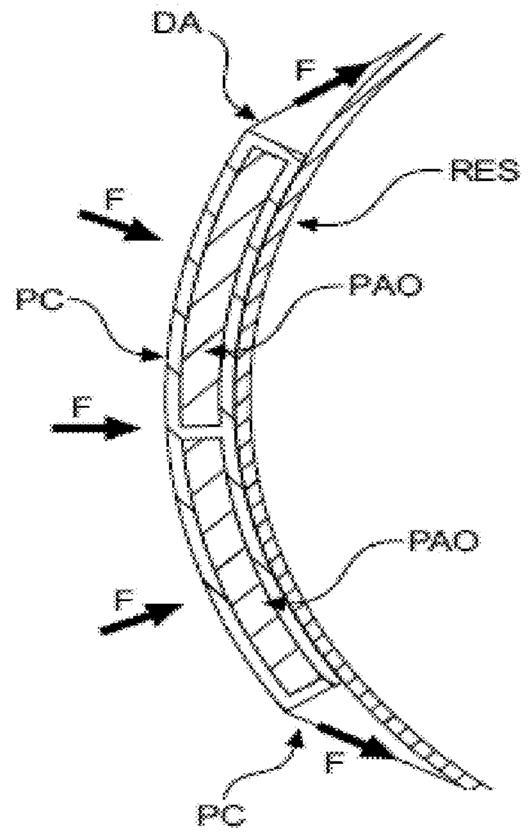

[Fig. 8]
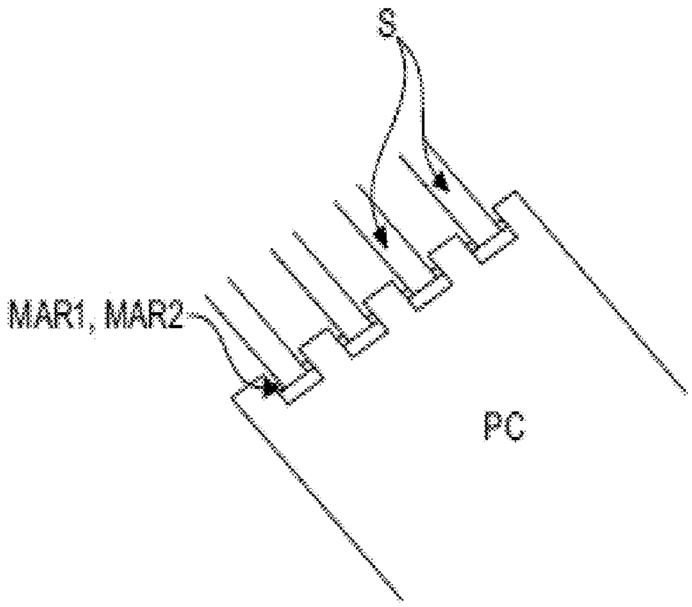

[Fig. 9]
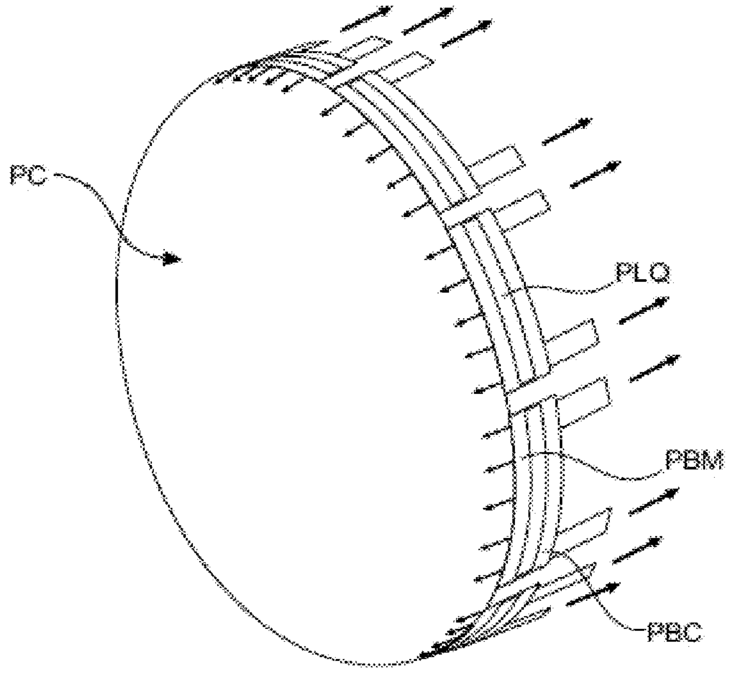

ATTACHMENT DEVICE FOR ATTACHING SELF-SEALING PLATES TO THE EXTERNAL WALL OF A TANK, ASSEMBLY EQUIPPED WITH SUCH AN ATTACHMENT DEVICE AND ASSOCIATED MOUNTING METHOD

TECHNICAL FIELD

The invention relates to the field of tanks equipped with self-sealing plates. Such tanks are used in particular in the defence sector. The invention relates more specifically to an attachment device for attaching such self-sealing plates to the external wall of the tank.

BACKGROUND

Tanks, typically petrol tanks, have long been known to be equipped on their external wall with plates filled with a self-sealing material. When a projectile impacts the tank, having passed through a plate filled with self-sealing material, this material naturally plugs the hole formed by the projectile to limit or stop any leakage.

These plates are generally glued to the external wall of the tank. In this respect, reference may be made, for example, to the document FR 3 001 410 A1, which proposes a self-sealing envelope, which may take the form of plates filled with self-sealing material, which is glued in practice to the external wall of the tank.

Although this gluing allows the self-sealing material to be mounted and held against the external wall of the tank, it poses a problem if the tank itself is to be recovered, for example for reuse after repair or not, depending on its condition, or simply to recover the materials of which it is made, which are generally metallic materials.

It is often difficult and time-consuming.

Some have proposed removable mounting means for plates of self-sealing material. Reference may be made to the solution proposed in U.S. Pat. No. 5,383,567A. In this document, a rigid box is proposed for enveloping the self-sealing material placed against the tank, the box comprising two parts which can be attached to each other. This solution requires a custom-built box for the tank in question. On the other hand, this implies a significant mass and is therefore not very suitable for a vehicle tank.

SUMMARY OF THE INVENTION

One aim of the invention is to resolve at least one of the above disadvantages.

To achieve at least one of these objectives, the invention proposes an attachment device for attaching self-sealing plates to an external wall of a tank, said attachment device comprising:

- a part shapeable to the shape of said self-sealing plates, said part comprising a first end and a second end opposite the first end,
- a plurality of straps each comprising a first strap end and a second strap end opposite the first strap end,
- a first connection means between the straps and the shapeable part, said first connection means connecting the different first strap ends to the first end of the shapeable part, and
- second connection means between the straps and the shapeable part, said second connection means connecting the different second strap ends to the second end of the shapeable part.

The device according to the invention may comprise at least one of the following characteristics, taken alone or in combination:

- each connection means between the straps and the shapeable part is in the form of a bar extending along the entire end of the shapeable part and on which the different strap ends are mounted;
- the first connection means comprises a first holding bar for said shapeable part and a first connecting bar for the straps on which all the first strap ends are mounted and, a first plate equipped with two longitudinal guides parallel to each other, a first longitudinal guide of the first plate receiving the first holding bar for said shapeable part and a second longitudinal guide of the first plate receiving the first connecting bar of said straps, and the second connection means comprises a second holding bar for said shapeable part, a second connecting bar for the straps on which all the second strap ends are mounted and a second plate also equipped with two longitudinal guides parallel to each other, a first longitudinal guide of the second plate receiving the second holding bar for said shapeable part and a second longitudinal guide of the second plate receiving the second connecting bar of said straps;
- the holding bars, the connecting bars and the longitudinal guides all have a circular cross-section;
- the connecting bars of the straps are made of a metallic material;
- the plates are made of a metallic material;
- the holding bars of the shapeable part are made of a metallic material;
- said shapeable part is chosen from: a canvas, a film made from a solid plastic material or a canvas covered with a solid plastic material, for example tarpaulin.

The invention also relates to an assembly comprising a tank, for example adapted to contain petrol, a plurality of contiguous self-sealing plates and an attachment device according to the invention, said plates being mounted against an external wall of the tank by means of said attachment device.

The invention also relates to a method for mounting an assembly according to the invention, said method comprising the following steps:

a) placing contiguously the self-sealing plates against the tank,
b) mounting the attachment device around said self-sealing plates,
c) tightening the straps of the attachment device so as to hold the self-sealing plates against the external wall of the tank.

BRIEF DESCRIPTION OF THE FIGURES

FIG. 1 is a perspective drawing of an attachment device in accordance with the invention in one embodiment, prior to being mounted around self-sealing plates to hold them against a tank;

FIG. 2 represents the attachment device of FIG. 1, alone, when mounted around the self-sealing plates that it holds against the tank;

FIG. 3 is an enlarged view of a part of the attachment device shown in FIG. 2;

FIG. 4 is a partial view, i.e. without the straps and without the shapeable part of the attachment device according to the invention as enlarged in FIG. 3;

FIG. 5 is a side view of the partial view in FIG. 4, representing a connection means between the straps and a shapeable part of the attachment device of FIG. 1 and its immediate surroundings;

FIG. 6 is a side view of a further connection means between the straps and the shapeable part of the attachment device of FIG. 1 and its immediate surroundings;

FIG. 7 is a partial cross-sectional view of an assembly comprising a tank, in this case cylindrical in shape, self-sealing plates and an attachment device in accordance with the embodiment of the invention shown in FIG. 1 to hold said plates against the external wall of the tank;

FIG. 8 is a variant embodiment of the connection means between the straps and the shapeable part of an attachment device according to the invention; and FIG. 9 is a variant embodiment of an attachment device according to the invention suitable for a domed or semi-domed tank.

DETAILED DESCRIPTION

We will first describe the attachment device DA for attaching self-sealing plates to a tank according to one embodiment of the invention, with reference to FIGS. 1 to 7.

The attachment device DA comprises a shapeable part PC that can be shaped to match the shape of the self-sealing plates PAO. This part being shapeable, it is particularly flexible in practice, so that it can be adapted to any conceivable shape for a tank; the shape of the tank determines the shape of the self-sealing plates, which must match the shape of the external wall of the tank.

The shapeable part PC comprises a first end PE and a second end DE, opposite the first end. The shapeable part PC is delimited at the level of its first end PE and its second end DE respectively by a first holding bar PBM for the shapeable part PC and a second holding bar DBM for the shapeable part PC.

The attachment device DA therefore also comprises holding bars PBM, DBM. The holding bars PBM, DBM are de facto rigid in relation to the shapeable part PC. In particular, they can be made of a metallic material.

The shapeable part PC of the attachment device DA can be a canvas, a film made of a solid plastic material or a canvas covered with a solid plastic material, for example tarpaulin. The material used is obviously much lighter than a rigid (metal) box solution. This shapeable part PC also has the advantage of being easily adaptable to all types of tanks. For example, all you have to do is define the dimensions required for the tank in question, for example from a roll of auger, cut it and then insert the ends of the cut-out into the holding bars. It's much simpler than with a rigid box solution.

These holding bars PBM, DBM are designed to interact with a plate PLQ, DLQ, which is described in more detail later.

The attachment device DA also comprises a plurality of straps S1, S2, S3. These straps S1, S2, S3 are arranged in parallel in this embodiment because the attachment device DA is intended to be installed on a cylindrical tank (see FIGS. 1 to 3 and FIG. 7).

Each strap S1, S2, S3 comprises a first strap end PES1, PES2, PES3 and a second strap end DES1, DES2, DES3 opposite the first strap end PES1, PES2, PES3. The different first strap ends are all connected to the same first connecting bar PBC for said straps. Similarly, the various second strap ends are all connected to the same second connecting bar DBC for said straps.

The attachment device DA therefore also comprises the connecting bars PBC, DBC for said straps. These connecting bars PBC, DBC are in fact rigid, as are the holding bars PBM, DBM described above. In particular, these connecting bars PBC, DBC can be made of a metallic material.

The attachment device DA also comprises the plates PLQ, DLQ which have been briefly described above. These plates are rigid in the same way as the holding bars PBM, DBM described above.

More specifically, the attachment device DA comprises a first plate PLQ which is equipped with two longitudinal guides GL11, GL12 parallel to each other. A first longitudinal guide GL11 of the first plate PLQ is designed to receive the first holding bar PBM connected to said shapeable part PC. A second longitudinal guide GL12 of the first plate PLQ is designed to receive the first connecting bar PBC for said straps S1, S2, S3.

More specifically, the attachment device DA also comprises a second plate DLQ also equipped with two longitudinal guides GL21, GL22 parallel to each other. A first longitudinal guide GL21 of the second plate DLQ is designed to receive the second holding bar DBM connected to said shapeable part PC. A second longitudinal guide GL22 of the second plate DLQ is designed to receive the second connecting bar DBC for said straps S1, S2, S3. In practice, the two plates PLQ, DLQ are advantageously identical. The plates PLQ, DLQ can be made of a metallic material.

With the attachment device DA according to the invention, each plate PLQ, DLQ then allows to distribute a tension applied by the straps S1, S2, S3 which is punctual at the level of the ends of said straps into a tension applied continuously and homogeneously to the ends PE, DE of the shapeable part PC. This effect can be seen with the arrows shown in FIG. 4 (upper part: 3 arrows representing the tensions imparted by the straps; lower part: effect on the side of the shapeable part PC). The tension finally applied by the attachment device DA to the self-sealing plates PAO can be seen in FIG. 7. The self-sealing plates are then perfectly held against the external wall of the tank and can therefore fulfil their function in the event of a bullet, for example, piercing the tank RES.

Advantageously, the holding bars PBM, DBM, the connecting bars PBC, DBC and the longitudinal guides GL11, GL12, GL21, GL22 of the plates PLQ, DLQ all have a circular cross-section. It then defines within each longitudinal guide GL11, GL12, GL21, GL22 a pivot link offering 1 degree of freedom in rotation between the shapeable part PC and each plate PLQ, DLQ, but also between the straps S1, S2, S3 and each plate PLQ, DLQ. In this way, when the straps are tightened, it is easier to tension the shapeable part and, as a result, uniformly pressurise the various self-sealing plates against the tank.

In the above description, it should be noted that the first holding bar PBM for the shapeable part PC, the first connecting bar PBC for the straps S1, S2, S3 and the first plate PLQ together form a first connection means MAR1 between the straps S1, S2, S3 and the shapeable part PC. Similarly, the second holding bar DBM for the shapeable part PC, the second connecting bar DBC for the straps S1, S2, S3 and the second plate DLQ together form a second connection means MAR2 between the straps S1, S2, S3 and the second plate DLQ.

In a variant embodiment, it is possible to provide a different design for each of the connection means MAR1, MAR2.

Thus, and as shown in FIG. 8, each connection means MAR1, MAR2 between the straps S1, S2, S3 and the shapeable part PC can take the form of a bar extending along the entire end of the shapeable part PC and on which the different strap ends are mounted. This bar then receives both the ends of each of the straps and the end of the shapeable part PC. To achieve this, the end of the shapeable part PC has a series of contact areas with the locally protruding bar. The bar allows to distribute the tension applied by the straps S1, S2, S3, which is punctual at the level of the ends of said straps, into a tension applied continuously and relatively homogeneously to the ends PE, DE of the shapeable part PC. The bar can be cylindrical or other shapes. The bar can be made of a metallic material.

In addition, in the example embodiment discussed in FIGS. 1 to 7, we have presented an attachment device DA suitable for a cylindrical tank. The tank can take many other shapes, and so there may be a need to hold self-sealing plates in position on many different tank shapes.

FIG. 9, for example, shows a case where the attachment device in accordance with the invention is intended to hold self-sealing plates in position against a domed or semi-domed tank shape. In the case in point, the connection means MAR is of the type described in support of FIGS. 1 to 7, namely with a plate PLQ. Of course, it is entirely possible to envisage a connection means MAR consistent with that described in FIG. 8.

The invention also relates to an assembly ENS comprising a tank RES, for example suitable for containing petrol, a plurality of contiguous self-sealing plates PAO and an attachment device DA consistent with the invention, said self-sealing plates PAO being mounted against an external wall PEXT of the tank by means of the attachment device DA.

Finally, the invention relates to a method for mounting an assembly ENS as described above, said method comprising the following steps:

a) placing contiguously the self-sealing plates PAO against the tank RES, b) mounting the attachment device DA around said self-sealing plates PAO, and c) tightening the straps S1, S2, S3 of the attachment device DA so as to hold the self-sealing plates against the external wall of the tank.

The plates can, for example, have a sticky effect to hold them in place against the tank before the attachment device is mounted and the straps tightened.

The invention claimed is:

1. An attachment device of self-sealing plates to an external wall of a tank, said attachment device comprising:

a part shapeable to the shape of said self-sealing plates, said part comprising a first end and a second end opposite the first end, a plurality of straps each comprising a first strap end and a second strap end opposite the first strap end, a first connector between the straps and the shapeable part, said first connector connecting the different first strap ends to the first end of the shapeable part; and a second connector between the straps and the shapeable part, said second connector connecting the different second strap ends to the second end of the shapeable part.

2. The attachment device as claimed in claim 1, wherein each connector between the straps and the shapeable part is in the form of a bar extending along the entire end of the shapeable part and on which the different strap ends are mounted.

3. The attachment device as claimed in claim 1, wherein:

the first connector comprises a first holding bar for said shapeable part and a first connecting bar for the straps on which all the first strap ends are mounted and, a first plate equipped with two longitudinal guides parallel to each other, a first longitudinal guide of the first plate receiving the first holding bar for said shapeable part and a second longitudinal guide of the first plate receiving the first connecting bar of said straps, and the second connector comprises a second holding bar for said shapeable part, a second connecting bar for the straps on which all the second strap ends are mounted and a second plate also equipped with two longitudinal guides parallel to each other, a first longitudinal guide of the second plate receiving the second holding bar for said shapeable part and a second longitudinal guide of the second plate receiving the second connecting bar of said straps.

4. The attachment device according to claim 3, wherein the holding bars, the connecting bars and the longitudinal guides all have a circular cross-section.

5. The attachment device according to claim 3, wherein the connecting bars of the straps are made of a metallic material.

6. The attachment device according to claim 3, wherein the plates are made of a metallic material.

7. The attachment device according to claim 3, wherein the holding bars of the shapeable part are made of a metallic material.

8. The attachment device according to claim 1, wherein said shapeable part is selected from: a canvas, a film made from a solid plastic material or a canvas covered with a solid plastic material.

9. The attachment device according to claim 8, wherein said solid plastic material is tarpaulin.

10. An assembly comprising a tank, for example suitable for containing petrol, a plurality of contiguous self-sealing plates and an attachment device according to claim 1, said plates being mounted against an external wall of the tank by said attachment device.

11. A method for mounting an assembly according to claim 10, said method comprising the following steps:

placing contiguously the self-sealing plates against the tank, mounting the attachment device around said self-sealing plates, tightening the straps of the attachment device so as to hold the self-sealing plates against the external wall of the tank.

12. The assembly according to claim 10, wherein the tank is suitable for containing petrol.

* * * * *